United States Patent

Yoo

(10) Patent No.: US 7,099,586 B2
(45) Date of Patent: Aug. 29, 2006

(54) RECONFIGURABLE MULTI-CHANNEL ALL-OPTICAL REGENERATORS

(75) Inventor: Sung-Joo Ben Yoo, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/934,673

(22) Filed: Sep. 2, 2004

(65) Prior Publication Data

US 2005/0053377 A1 Mar. 10, 2005

Related U.S. Application Data

(60) Provisional application No. 60/500,401, filed on Sep. 4, 2003.

(51) Int. Cl.
H04J 14/02 (2006.01)
H04B 10/02 (2006.01)

(52) U.S. Cl. .......................... 398/79; 398/173

(58) Field of Classification Search ................ 398/79, 398/135–201
See application file for complete search history.

(56) References Cited

U.S. PATENT DOCUMENTS

| | | | | |
|---|---|---|---|---|
| 5,359,449 | A * | 10/1994 | Nishimoto et al. | 398/198 |
| 6,069,732 | A * | 5/2000 | Koch et al. | 359/344 |
| 6,337,755 | B1 * | 1/2002 | Cao | 398/97 |
| 6,504,631 | B1 * | 1/2003 | Barry et al. | 398/83 |
| 6,532,091 | B1 * | 3/2003 | Miyazaki et al. | 398/175 |
| 6,563,621 | B1 * | 5/2003 | Dave et al. | 398/176 |
| 6,614,582 | B1 * | 9/2003 | Mikkelsen et al. | 359/326 |
| 6,775,426 | B1 * | 8/2004 | Ito et al. | 385/11 |
| 6,775,481 | B1 * | 8/2004 | Janz et al. | 398/175 |
| 2001/0050794 | A1 * | 12/2001 | Brindel et al. | 359/176 |
| 2003/0170028 | A1 * | 9/2003 | Mori et al. | 398/79 |
| 2004/0013433 | A1 * | 1/2004 | Alexander et al. | 398/91 |
| 2004/0056243 | A1 * | 3/2004 | Atanackovic et al. | 257/19 |
| 2004/0170438 | A1 * | 9/2004 | Kuribayashi | 398/175 |

OTHER PUBLICATIONS

Publication: D. Wolfson et al., "All-optical 2R regeneration at 40 Gbit/s in an SOA-based Mach-Zehnder interferometer", OFC, pp. PD36-1-PD36-3.

Publication: T. Gyselings et al., "Strong improvement in optical signal regeneration and noise reduction through asymmetric biasing of mach-zehnder interferometric all-optical wavelength converters", ECOC 97- Sep. 22-25, 1997, Conference Publication No. 48, pp. 188-191.

Publication: M. Zhao et al., "Demonstration of Extinction Ratio Improvement from 2 to 9 dB and intensity noise reduction with the MZI-GCSOA all-optical 2R regenerator", IEEE Photonics Technology Letters, vol. 14, No. 5, Jul. 7, 2002, pp. 992-994.

(Continued)

Primary Examiner—Kenneth Vanderpuye
Assistant Examiner—David Lee
(74) Attorney, Agent, or Firm—Park, Vaughan & Fleming, LLP

(57) ABSTRACT

An all-optical regenerating circuit including a wavelength converter based on a Mach-Zehnder interferometer. The input signal is amplified and the interferometer adjusted to place the input signal across an entire monotonic portion of a sinusoidal transfer function to the wavelength-converted output signal. Retiming is effected by wavelength converters including pulsed laser sources of the output wavelength. A multi-wavelength regenerator may be integrated on a chip including two arrayed waveguides and an array of tunable lasers on parallel waveguides therebetween.

25 Claims, 6 Drawing Sheets

OTHER PUBLICATIONS

Publication: S. Fischer et al., "Optical 3R regenerator for 40 Gbit/s networks", Electronics Letters, vol. 35, No. 23, Nov. 11, 1999, pp. 2047 to 2049.

Publication: D. Wolfson et al., "40-Gb/s all-optical wavelength conversion, regeneration, and demultiplexing in an SOA-Based all-active mach-zehnder interferometer", IEEE Photonics Technology Letters, vol. 12, No. 3, Mar. 2000, pp. 332-334.

Publication: O. Leclerc et al.. "Simultaneously regenerated 4×40 Gbit/s dense WEM transmission over 10,000km using single 40 Ghz InP Mach-Zehnder modulator", Electronics Letters, vol. 36, No. 18, Aug. 31, 2000, pp. 1574-1575.

Publication: S. Bigo et al., "All-optical regenerator for 20 Gbit/s transoceanic transmission", Electronic Letters, May 22, 1997, vol. 33, No. 11, pp. 975-976.

Publication: Y. Chen et al., "Monolithic colliding-pulse mode-locked quantum-well lasers", IEEE Journal of Quantum Electronics, Oct. 1992, vol. 28, No. 10, pp. 2176-2185.

Publication: P.B. Hansen et al., "A 1.54-μm Monolithic Semiconductor Ring Laser: CW and Mode-Locked Operation", IEEE Photonics Technology Letters, vol. 4, No. 3, May 1992, pp. 411-413.

Publication: M. Owen et al., "10-Gbits/s all-optical 3R regeneration and format conversion using a gain-switched DFB laser", CLEO 2000/Thursday Afternoon, 2000, pp. 472-473.

Publication: T. Otani et al., "40-Gb/s optical 3R regenerator using electroabsorption modulators for optical networks", Journal of Lightwave Technology, vol. 20, No. 2, Feb. 2000, pp. 195-200.

Publication: L. Xu et al., "All-optical data format conversion between RZ and NRZ based on a mach-zehnder interferometric waveguide converter", IEEE Photonics Technology Letters, vol. 15, No. 2, Feb. 2003, pp. 308-310.

Publication: K. Smith et al., "All-optical clock recovery using a mode-locked laser", Electronic Letters, vol. 28, No. 19, Sep. 10, 1992, pp. 1814-1816.

Publication: I. Ogura et al., "Picosecond all-optical gate using a saturable absorber in mode-locked laser diodes", IEEE Photonics Technology Letters, vol. 10, No. 4, Apr. 1998, pp. 603-605.

Publication: G. Morthier, "Experimental demonstration of an all-optical 2R regenerator with adjustable decision threshold and "true" regeneration characteristics", IEEE Photonics Technology Letters, vol. 12, No. 11, Nov. 2000, pp. 1516-1518.

Publication: P.V. Studenkov et al., "Monolithic Integration of an All-Optical mach-zehnder demultiplexer Using an Asymmetric Twin-Waveguide Structure", IEEE Photonics Technology Letters, vol. 13, No. 6, Jun. 2001, pp. 600-602.

Publication: R. Schreieck et al., "Ultrafast switching dynamics of mach-zehnder interferometer switches", IEEE Photonics Technology Letters, vol. 13, No. 6, Jun. 2001, pp. 603-605.

Publication: O. Leclerc et al., 40Gbit/s polarization-insensitive and wavelength-independent InP mach-zehnder modulator for all-optical regeneration, Electronics Letters, Apr. 29, 1999, vol. 35, No. 9, pp. 730-731.

\* cited by examiner

RECONFIGURABLE MULTI-CHANNEL ALL-OPTICAL REGENERATORS

RELATED APPLICATION

This application claims benefit under 35 U.S.C. §119 of provisional application 60/500,401, filed Sep. 4, 2003, which is incorporated herein by reference in its entirety.

BACKGROUND OF THE INVENTION

1. Field of the Invention

The invention relates generally to optical communications systems. In particular, the invention relates to optical regenerators in optical communication systems.

2. Background Art

Communication networks are increasingly being implemented with optical fiber as the transmission medium. Optical fiber, particularly silica fiber, offers many advantages of high bandwidth, low noise, and relatively low loss. The total bandwidth can be further increased by wavelength division multiplexing (WDM) in which multiple optical carriers of wavelengths differing by about a nanometer or less are modulated with separate data signals and are then multiplexed onto a single optical fiber.

Much effort has been expended in reducing the loss due to absorption in optical fiber. As a result, optical signals can be transmitted over many kilometers without the need for amplification or regeneration of the signals. Nonetheless, there is some loss, particularly if the fiber is spliced. Further loss occurs in all-optical switching nodes, including passive couplers, which can be inserted into the optical path to eliminate the need to convert the signal between optical and electrical forms for switching. Accordingly, many optical communication networks, particularly those spanning significant distances, include optical amplifiers which can amplify the optical signal without the need for converting it to electrical form. Erbium-doped fiber amplifiers are commonly used for such optical amplification. They are particularly useful because they have a substantial gain bandwidth sufficient to simultaneously amplify a large number of WDM wavelengths without the need to demultiplex them before amplification.

Optical amplification should be contrasted with conventional regeneration in which the modulation of a transmission signal is detected and the extracted data is used to modulate a new transmission carrier, whether it be electrical or optical. In optical transmission, the conventional regeneration requires an optical to electrical (O/E) conversion and an electrical to optical (E/O) conversion.

Optical amplification enjoys additional advantages over conventional regeneration because it is independent of the data format. For example, Yoo has proposed an optical router in U.S. patent application Ser. Nos. 09/654,384 and 10/081,396, filed respectively on Sep. 2, 2000 and Feb. 22, 2002, now issued as U.S. Pat. Nos. 6,519,062 and 6,768,827, both incorporated herein by reference in their entireties. Such optical routers allow packets to be routed across a complex optical network according to addressing information contained in their headers without the need to decode the data portion. Optical amplifiers can amplify such optical packets without decoding any portion of the packet or even knowing the packet format. However, optical amplifiers have a non-flat gain spectrum and produce noise. Therefore, amplification alone does not prevent degradation of the data waveform and its timing.

Loss, however, is not the only limiting factor for fiber transmission. Depending upon the chosen transmission wavelength and the particulars of the fiber, there may be some chromatic, waveguide, or other temporal dispersion, which broadens the wave form of the optical data signal. Further, although fiber noise is low, some noise becomes impressed on the optical data signal so that square data pulses are degraded. Sources of noise include non-linearities and cross-talk. Accordingly, reshaping of the optical pulse is desired. Yet further, the timing of the pulse train may become degraded, for example, by jitter in the transmitter or in other elements (perhaps caused by temperature variation), temporal dispersion in the fiber, indefinite pulse edges due to shape degradation, polarization mode dispersion (PMD), polarization dependent loss (PDL). Simply reshaping the optical pulses does not completely address the timing problem. Conventional electrical regenerators reshape binary signals to nearly their original form and provide a new, reclocked signal in a process often referred to as retiming or reclocking. Conventional optical amplifiers do not reshape or retime optical data signals. It is nonetheless desirable to accomplish the regeneration, reshaping, and reclocking of optical signals, often referred to as 3R regeneration, without converting the optical signals to electrical form.

Amplification or regeneration is additionally desirable in complex optical networks receiving input signals from disparate sources over different transmission paths and lengths but switching them through a common switching or routing fabric. Further, the source power of the distant transmitter may vary over time. It is desirable that the switched signals be of nearly equal amplitude or power to allow common optimization of the switch fabric. Electronic regeneration performs this power equalization. Isolated optical amplifiers require close control to effect dynamic power equalization.

As a result, even optical networks would benefit from regeneration. However, the standard electrical regeneration requiring optical-to-electrical (O/E) conversion and E/O conversion for each of the WDM channels as well as decoding the packet format does not scale well with a large number of WDM wavelengths.

Much recent work has addressed 3R regeneration of optical signals. However, many of the approaches involve complex optical systems, often in conjunction with analog electronic components, which are not suited for commercialization. It is greatly desired to provide optical regeneration in an integrated system amenable to mass production.

SUMMARY OF THE INVENTION

One aspect of the invention is an optical regenerator including a wavelength converter having a Mach-Zehnder interferometer with two active regions in which the data-modulated input signal at one wavelength interferes with a probe signal at the same or different wavelength to transfer the data modulation to the probe signal. The active regions are biased and/or the input signal amplified such that the interferometer operates across a substantial portion of one monotonic part of a wave-shaped, preferably sinusoidally shaped, transfer function.

Retiming may be effected by the probe signal providing a train of narrow optical pulses optically locked to the data-modulated input signal, for example, in a mode locked laser driven by the modulated input signal and outputting a train of narrow clock pulses.

Advantageously, the input and probe signal are passed in opposite directions through the active regions, thereby eliminating the need for output filters and allowing small and even zero change in the wavelengths.

The regenerator is advantageously used in a wavelength division multiplexing (WDM) communication network in which each wavelength-separated signal is separately regenerated.

The regenerator may be an independent system. For example, in a WDM system, an optical demultiplexer demultiplexes a multi-wavelength signal into its frequency components. Wavelength converters having CW laser sources at respective wavelengths interact in wavelength converters with the frequency components of the received signal to transfer the data modulation of the received signals onto the newly generated optical carriers. The wavelength conversion may include zero or small conversion of wavelengths or substantial changes in the wavelengths. The wavelength converted signals are recombined in an optical multiplexer to form a regenerated WDM multi-wavelength signal. The regeneration may be performed upon a single wavelength carrier.

The regenerator may be incorporated into another optical transmission system, especially an all-optical switching system. For example, an optical router includes a wavelength router, tunable input wavelength converters for determining a switching path of wavelength-separated signals through the wavelength router, and further output wavelength converters for converting the switched carrier wavelengths to standard transmission wavelengths. The regenerator of the invention may be incorporated into the input or output wavelength converters, preferably the output ones.

The regenerator may be integrated in a single semiconductor chip, for example, of InP, including, for example, waveguides and couplers needed for one or more interferometers, arrayed waveguide gratings, semiconductor optical amplifiers, and lasers, especially tunable lasers. A mode locked laser for a new clock signal may also be integrated in the chip.

DETAILED DESCRIPTION OF THE PREFERRED EMBODIMENTS

The preferred implementations of the optical routers of the previously cited patents to Yoo use wavelength converters both for determining the switch state of the router for a wavelength-converted packet but also to efficiently use the WDM wavelengths of the output fibers. Wavelength converters, when properly operated according to the invention can perform optical regeneration, reshaping, and retiming either in an independent regenerator or in conjunction with optical equipment such as the above mentioned optical router. Although the invention is not so limited, wavelength conversion may be accomplished with a Mach-Zehnder (MZ) interferometer.

Figure 1:
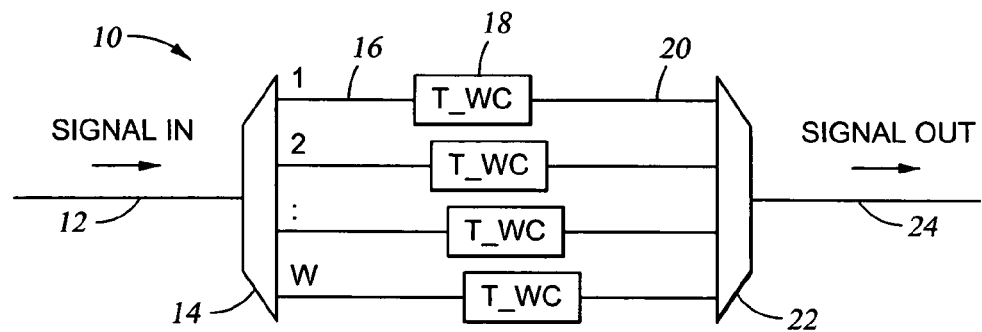
FIG. 1 is a functional representation of a multi-wavelength optical regenerator of the invention.

A general schematic of one embodiment of an optical regenerator is represented in FIG. 1. An input fiber 12 carries a multi-wavelength WDM signal composed of W optical signals of different data impressed on and modulating respective optical carriers of wavelengths $\lambda_1$ to $\lambda_W$. An optical demultiplexer 14 receives the output of the input fiber and demultiplexes the multi-wavelength signal into W single-wavelength signals on optical lines 16, typically waveguides. Respective tunable wavelength converters 18 receive those single-wavelength signals and convert their carrier wavelengths but maintain the data modulated on the carriers. The wavelength-converted signals are input via optical lines or waveguides 20 to an optical multiplexer 22, which multiplexes those W signals onto an output fiber 24.

Although the invention is not so limited, the demultiplexer 14 and multiplexer 22 may be implemented as arrayed waveguide gratings (AWGs). Both may be formed in a same substrate, for example, of InP, as well as the waveguides 16, 20 and at least parts of the wavelength converters 18 and of the input and output waveguides 12, 24, themselves usually converted to optical file. Silica or other glass substrates may be used for the passive components. Yoo has described the fabrication process for similar integrated systems in the aforecited '396 application and in U.S. patent application Ser. No. 10/645,165, filed Aug. 20, 2003 and entitled Optical Code Division Multiple Access Network Utilizing Reconfigurable Spectral Phase Coding, incorporated herein by reference in its entirety.

The wavelength conversion, when properly controlled, acts to regenerate the optical signals, as will be described somewhat later. The wavelength conversion may involve a substantial change in wavelength, for example, between different WDM wavelengths in a predetermined WDM wavelength grid or even between different sets of WDM wavelength grids. On the other hand, the wavelength conversion may involve a small change in wavelength, for example, compensating for wavelength drift. The wavelength conversion, as that term is used here unless specified otherwise, may include substantially no change of wavelength or a substantial change of wavelength. However, a zero wavelength conversion includes generating an unmodulated optical carrier at the carrier frequency of the optical input signal and then modulating it according to the input optical data signal. However, the wavelength conversion needs to avoid impressing two data channels with the same carrier wavelength.

The wavelength conversion may be performed in a Mach Zehnder (MZ) interferometer, preferably integrated into a single semiconductor substrate together with active semiconductor regions. The MZ interferometer may be implemented in a number of ways. In one embodiment of an MZ interferometric wavelength converter 30, illustrated in FIG.

2, an optical input signal 32 varying with time t (only the carrier modulation is shown, not the carrier oscillation) is input through a waveguide 34 to a semiconductor optical amplifier (SOA) 36, both formed in a semiconductor substrate 38. An optical fiber may couple the signal into a side of the substrate 36 in the vicinity of the waveguide 34. The amplification gain factor in the SOA 36 is selected to put the input signal at the peak-to-peak amplitude of the transfer function to be described later, in particular the saturated output power of the active region operating as the SOA 36. A laser 40, preferably a laser waveguide diode and possibly formed in the substrate 38, provides a probe signal at the desired new wavelength. Preferably, its wavelength is tunable, either over small wavelength ranges or large ones, although in some applications its wavelength may be substantially fixed. The probe signal is split, typically 50:50, by a Y-coupler 42 in the semiconductor waveguides in the substrate 38, for example formed by a multi-mode interference (MMI) filter connected to three single-mode waveguides.

One split part of the probe signal is combined in another Y-coupler 44 with the amplified input signal and passed through a first active region 46, wherein there is a non-linear interaction between the input and probe signals, which causes the data modulation of the input signal to be partially transferred to the probe signal. The other part of the probe signal from the Y-coupler 42 is passed through a second active region 48, typically with no other optical signal being present but otherwise subject to the same processing as in the first active region 46 although there may be differential biasing to produce a phase shift between the two arms of the MZ interferometer. However, another Y-coupler 50 may combine the waveguide split from the probe amplifier 40 with a null waveguide 52 to provide a matched input to the second active region 48. The active regions 46, 48 are typically waveguided electro-optical diodes which may be forward biased to act as semiconductor optical amplifiers or reversed biased to act as electro absorbers, the latter being an advantageous configuration described by Yoo in U.S. Pat. No. 6,563,627, incorporated herein by reference in its entirety. Absorbers have the advantage of lower power and reduced gain cross-talk.

The outputs from the two active regions 46, 48 are interferometrically recombined in yet another waveguide Y-coupler 54 to form a converted output signal 56 which has the data modulation of the input signal 32 modulating the carrier wavelength of the probe signal from the laser 40. This operation acts to regenerate the input signal, typically at a different wavelength but possibly at the same wavelength.

If the amplification gain is correctly chosen, the wavelength conversion also substantially reshapes a noisy or degraded input pulse. If the probe signal source 40 provides a pulsed rather than continuous wave (CW) output, when it is properly configured as described later, it also effects retiming to compensate for time jitter and the like. In the retiming, a sequence of well defined pulses at the data clock rate is used as the probe signal. Only during the presence of the pulses, typically pulsed CW, will the active regions 46, 48 cause a wavelength conversion from the input signal 32 to the wavelength of the probe pulse from probe source 40. It may be preferred that the SOA 36 amplifies the input signal 32 to the point that it saturates its active region 46 operating in amplification. The resultant long lifetime tail can accommodate a wide spread between the old and regenerated pulses. Such a procedure works for other types of Mach-Zehnder interferometers described below and also for those introducing differencing in their outputs.

Figure 2:
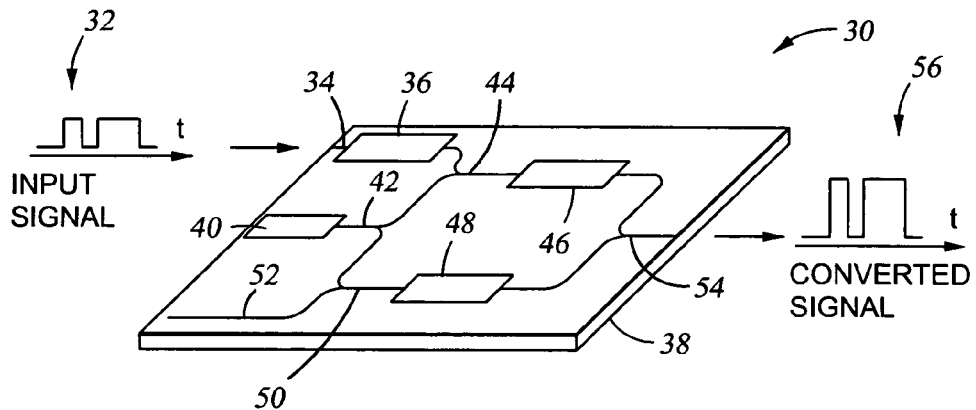
FIGS. 2, 3, and 4 are two orthographic views and one plan view of a first, second, and third embodiments respectively of a single-wavelength optical regenerator circuits based on Mach-Zehnder interferometers and usable with the regenerator of FIG. 1.

In the co-propagating MZ regenerating wavelength converter 30 of FIG. 2 in which the input and probe signals propagate in the same direction through the first active region 46, a problem arises that spectral filtering is needed on the output to remove any residual power left from the input signal at the original wavelength. Such filtering makes it nearly impossible for the new wavelength to be the same as the old wavelength. If only small changes in wavelength are desired, such as to compensate source drift, the filtering remains difficult. Even filtering between adjacent WDM wavelengths is non-trivial.

Figure 3:
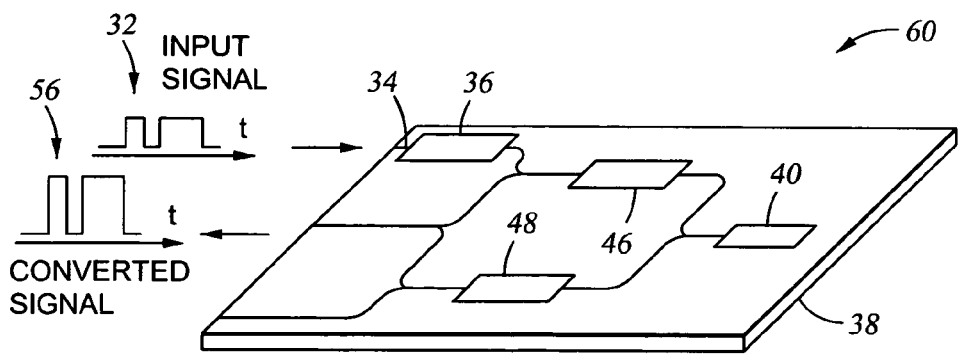

Some of these problems can be solved with a counter-propagating regenerating MZ wavelength converter 60 illustrated in FIG. 3, in which the tunable laser 40 is moved to a position in the interferometer such that the input signal 32 and the probe signal from the probe source 40 propagate in opposite directions through the first active region 46. Thereby, there is no direct path for the carrier of the input signal 32 to directly propagate to the output port carrying the converted output signal 56. Accordingly, output filtering may not be required and the input and probe wavelengths may be close and perhaps even the same. This design has the problem however that the residual input signal at the original wavelength, which is data modulated, is input to the optical cavity of the tunable laser 40 and therein affects the stability of the otherwise CW laser 40, especially if the wavelengths are relatively close.

Figure 4:
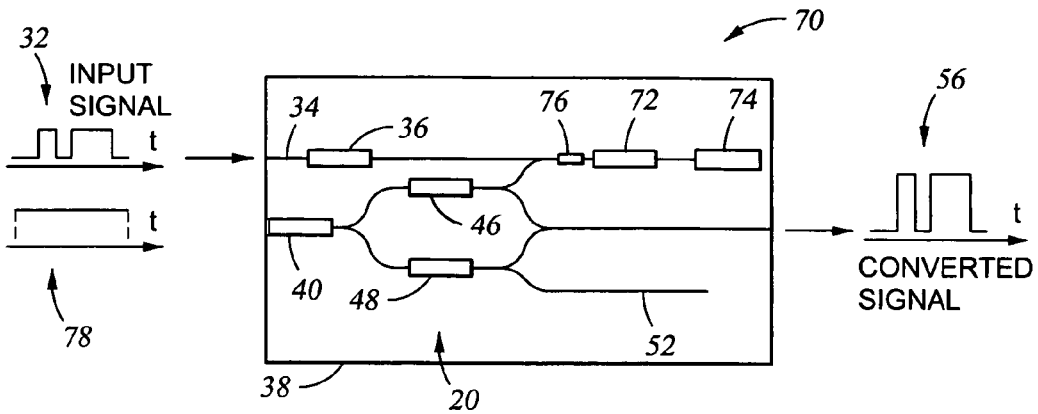

A cascaded MZ interferometric wavelength converter 70 of FIG. 4 solves most of these problems. It is assumed that the input signal is in the 1550 nm band used in WDM networks, e.g. 1535 to 1565 nm. After the being amplified in the SOA 36, the input signal 32 is passed in one direction through a cross-gain modulation semiconductor optical amplifier 72 while CW radiation from a 1520 nm laser diode 74 passes in the other direction, whereby the second SOA 72 acts as a wavelength converter to transfer the input data modulation to the 1520 nm light. The probe radiation is chosen at 1520 nm since it is on the low wavelength side of the transmission band and separated from it by a substantial difference but is at the edge of the SOA transparency band. The converted optical signal at 1520 nm leaving the second SOA 72 to the left is split by a 1520/1550 splitter 76, which in the opposite direction passes the 1550 nm-band input signal 32 from the SOA 36. The split optical power enters the primary MZ interferometer, which has the functional structure of the MZ interferometer 60 of FIG. 3. The wavelength of a primary probe signal 78 from the tunable laser 40 may be any wavelength in the 1550 nm band including the input wavelength. Alternatively, the WDM grid or even the wavelength band can be changed, preferably as long as it avoids the 1520 nm pump source. Because of the large difference between the 1520 nm radiation and the 1550 nm band radiation, the 1550 nm input signal does not interfere with the 1520 nm laser 74 or may be easily filtered. Similarly, the residual 1520 nm radiation in the primary MZ interferometer does not severely affect the tunable laser 40. It is of course appreciated that wavelengths other than 1520 nm may be used that are preferably outside of the WDM transmission band. Also, the effect can be achieved in other transmission bands, such as the 850 and 1310 nm bands also used in WDM communication.

Figure 5:
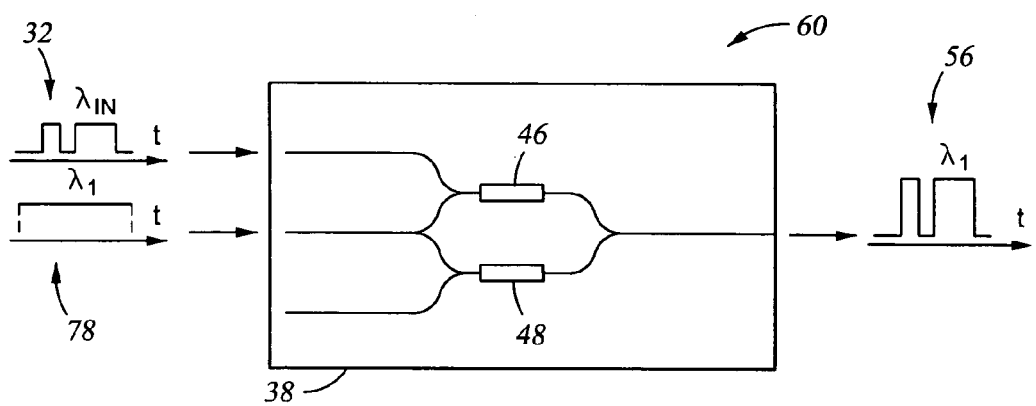
FIG. 5 is a plan view of a Mach-Zehnder interferometer illustrating wavelength conversion.

The regeneration and reshaping operation will now be explained with reference to FIG. 5, which shows the MZ regenerating wavelength converter 60 of FIG. 3 although the explanation applies to other MZ wavelength converters as well as to more generic converters. The input data signal 32 at carrier wavelength $\lambda_{IN}$ is converted to an output signal 56 at a wavelength $\lambda_1$ determined by a tunable laser.

Figure 6:
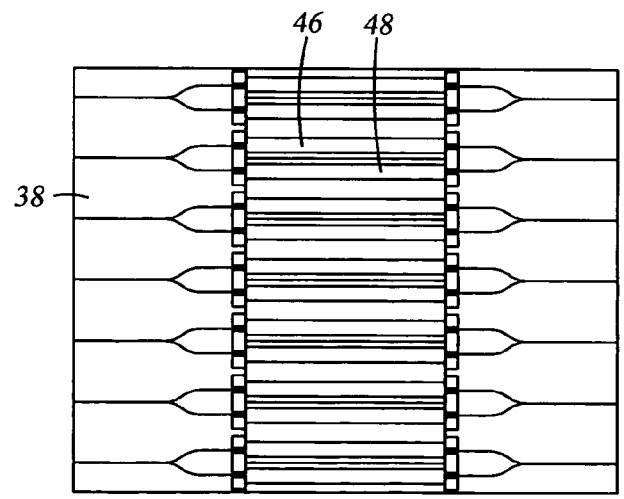
FIG. 6 is a plan view of a layout of an array of Mach-Zehnder interferometers.

The plan view of FIG. 6 right shows an integrated circuit chip with the active regions 46, 48 of a number of parallel MZ interferometers and associated waveguides formed in an InP substrate.

Figure 7:
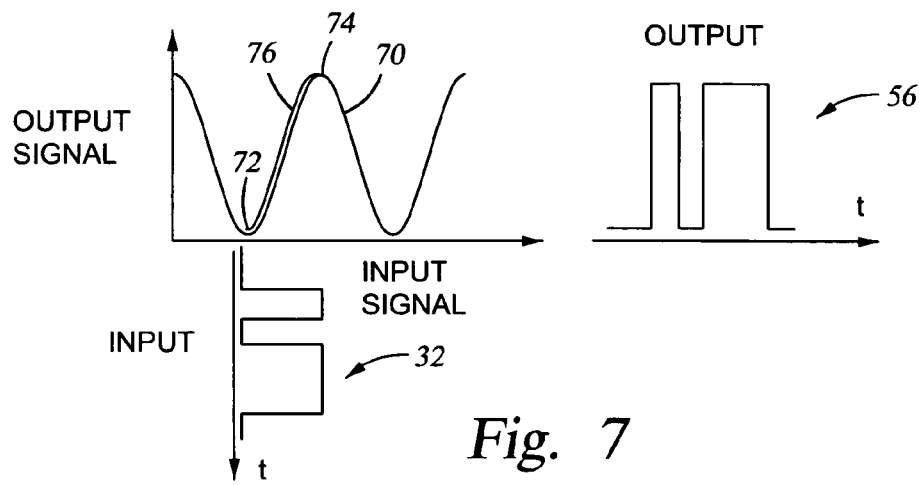
FIG. 7 is a graphical representation of the mechanism for pulse amplification in an interferometer.

The schematic diagram of FIG. 7 shows a transfer function 70 between the power (integrated carrier amplitude) of the output signal 56 as a function of the power of the input signal 32 as the Mach-Zehnder interferometer 60 converts the carrier wavelength between the two. The amplitude of the output signal 56 is proportional to a wave-shaped function, which for a Mach-Zehnder interferometer is the sinusoidal function $$\cos^2(\phi_1+\phi_2+\text{const})$$

where $\phi_1$ and $\phi_2$ are the phases introduced by the two active regions 46, 48 in the two arms of the MZ interferometer. The sinusoidal behavior follows from the interference. The input SOA amplifier 36 may be adjusted to amplify the amplitude or power of the input signal 32 and the biasing of the MZ active regions 46, 48, which may be adjusted such that in the amplified signal the minimum or zero state of the input signal corresponds to a trough 72 of the sinusoidal transfer function 70 and the maximum or one state of the input signal corresponds to its peak 74 or vice versa. With either proper pre-amplification of the input power or adjustment of the Mach-Zehnder biasing, the wavelength conversion is performed substantially over a single monotonic portion 76 of the S-shaped transfer function 70, preferably extending from the peak 74 to the trough 72. This is alternatively called a peak-to-peak portion of the transfer function 70. Noise will occasionally drive the input power below or beyond the trough 72 or peak 74 to other portions of the transfer function 70, but these excursions should be small and occur near the zero-derivative points 72, 74. A simple adjustment procedure is to adjust the Mach-Zehnder biasing to move the transfer function 70 such that either its peak 74 or trough 72 corresponds to the average zero state of the optical input signal and then to adjust the pre-amplification such the other of its peak 74 or trough 72 corresponds to the average one state. As a result, the power and amplitudes of the two states of the output signal 56 at and near their nominal values have zero amplitude derivatives with respect to the corresponding power or amplitudes of the input signal. Further, small changes in the biasing leave much of the signal within the monotonic portion 76 of the transfer curve 70.

Figure 8:
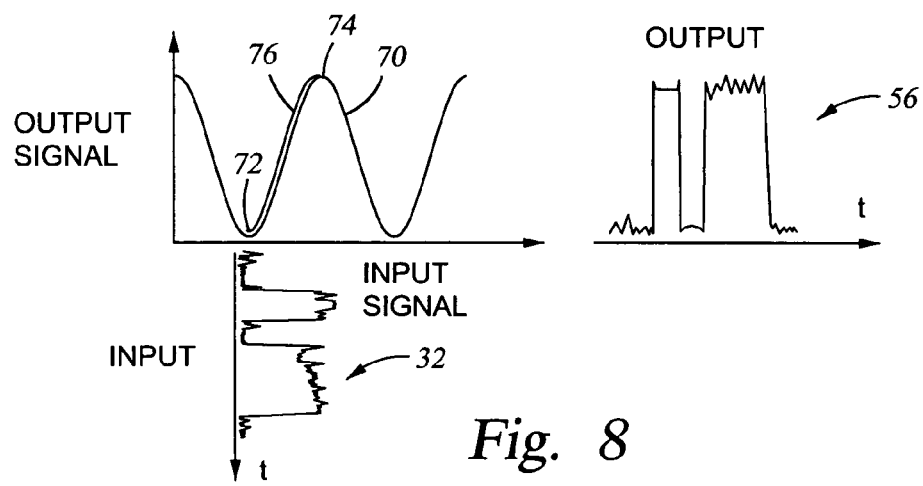
FIG. 8 is a graphical representation of the mechanism for pulse reshaping in an interferometer.

FIG. 8 more explicitly shows the shaping effect. The input signal 32 is illustrated with a substantial amount of noise impressed upon both its zero and one states. Because of the placement of the amplified input signal on the transfer function 70, the regenerator's output signal 56 continues to show some noise but the magnitude of the noise is suppressed because of the zero derivatives of output signal 56 at its zero and one values with respect to the noise fluctuations of the input signal 32.

Figure 9:
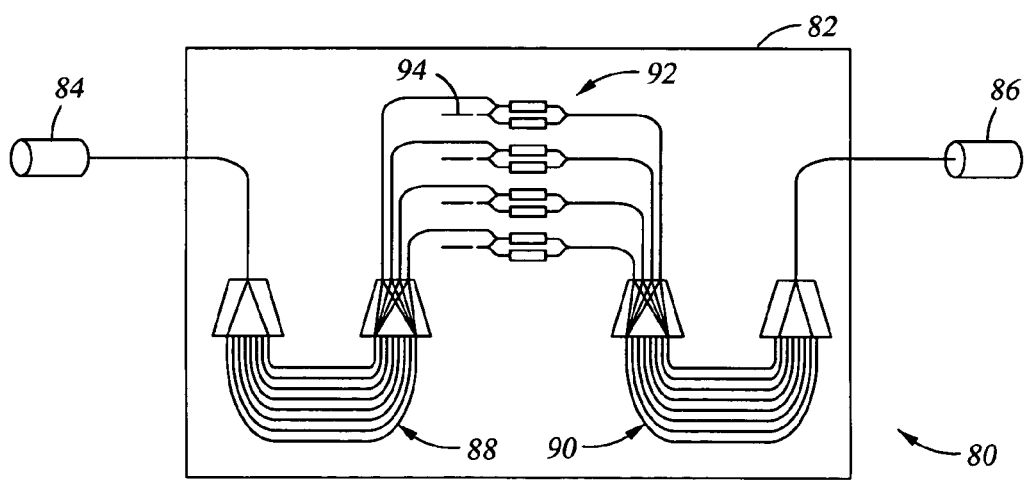
FIG. 9 is a plan view of an optical router of the invention, which can also implement regeneration and reshaping.

As illustrated in the plan view at FIG. 9, a multi-channel optical regenerator 80, including the functions of the regenerator 10 of FIG. 1, may be formed in a single monolithic chip 82, for example of indium phosphide, coupled on its edges to an input signal fiber 84 and an output signal fiber 86. Also formed in the substrate are an arrayed waveguide grating (AWG) demultiplexer 88 and an AWG multiplexer 90 to respectively demultiplex WDM input signal and to remultiplex them into W single-wavelength components in a WDM output signal. Mach-Zehnder wavelength converters 92 are disposed on respective wavelength channels between the two AWGs 88, 90 and include tunable lasers 94 determining the output wavelengths. Although the illustrated Mach-Zehnder interferometric wavelength converters 92 correspond to the converter 30 of FIG. 2, other types of Mach-Zehnder wavelength converters can easily be substituted and integrated into the same chip. Yoo's patent on integrated optical routers cited above provides more details of the fabrication method.

As is most evident in FIGS. 1 and 9, without signal switching, there is no fundamental need for the lasers 94 to be tunable, at least over large wavelength shifts, since the number of wavelengths is being maintained and often there is no need to shift the wavelength grid. However, it may be advantageous to provide limited wavelength or fine tuning to compensate for thermal drift on the regenerator chip.

The structure of FIG. 9 contains many of the same elements as Yoo's integrated optical router excepting a wavelength router and fixed output wavelength converters which would be connected between the tunable input wavelength converter and the multiplexer 90. Applying the invention to that optical router, the router's wavelength converters used for wavelength switching and for reconverting the switched signals for WDM transmission can be adjusted in conjunction with semiconductor amplifiers to effect the waveform shaping, particularly for packets not being dropped locally. Advantageously, the regeneration and retiming may be done at the fixed output wavelength converters.

The invention can also be integrated with optical add/drop multiplexers (ADMs), particularly when the ADMs exhibit only moderate complexity. An AWG is one structure that may be used to implement a demultiplexer having a plurality of multi-wavelength input ports or to implement a multiplexer having a plurality of multi-wavelength output port, where the plural multi-wavelength ports are one side of the AWG are wavelength coupled to single wavelength ports on the other side. A regenerating add/drop multiplexer 100, functionally illustrated in FIG. 10 includes an optical demultiplexer 102 receiving both a long-haul transmission input fiber 104 and one or more add waveguides 106, both the fiber and waveguides possibly carrying multi-wavelength WDM signals. The operation of such a demultiplexer 102 has been described before in reference to an AWG for coupling the input fiber 104 to multiple single-wavelength channels 108 according to wavelength. The coupling from the add waveguides 106 is similar although the wavelength dependence is typically progressively shifted at the output free-space region for the additional input ports at the input free-space region. Wavelength converters 110, preferably tunable as previously described, are disposed on the wavelength channels 108 between the demultiplexer 102 and a similarly arranged multiplexer 112 coupling those channels 108 to a multi-wavelength long-haul transmission output fiber 114 and to one or more multi-wavelength drop waveguides 116. The number of wavelength channels 108 and associated wavelength converters 110 needs to be increased to a number $W^+$ from the usual WDM number of W associated with long haul to accommodate the additional add and drop signals traversing the wavelength channels 108 within the regenerator and ADM 110. It is noted however that there is no requirement that the add or drop waveguides 106, 116 carry multiple wavelengths and a limited number of add/drop wavelengths simplifies the ADM design.

In operation, all the WDM signals received on the input fiber 104 are regenerated in the respective wavelength converters 110. If the wavelength signal received on the input fiber 104 is to be directly connected to the output fiber 114, the wavelength converters 110 may effect a zero wavelength shift although other conventions may be followed to swap wavelengths. However, if one or more of the received wavelength channels should be dropped at this ADM 100, the associated lasers of the wavelength converters 110 are tuned such that the converted wavelength signals are directed to one of the drop waveguides 116 and not to the output fiber 114.

If one of the add waveguides 106 contains a wavelength channel to be inserted into the output fiber 114, the wavelength converter 110 associated with that add channel converts the wavelength of the signal to one in which the multiplexer 112 directs it to the output fiber 114. Of course, multiple signals of the same wavelength should not be directed to the output fiber 114. The usual situation is that the same wavelength is dropped as is added.

Figure 10:
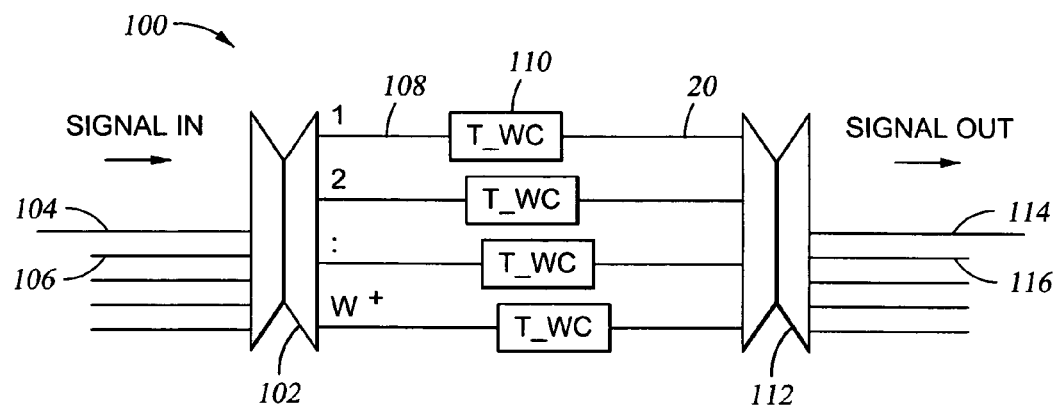
FIG. 10 is a function representation of an add/drop multiplexer, which can also implement regeneration and reshaping.
Figure 11:
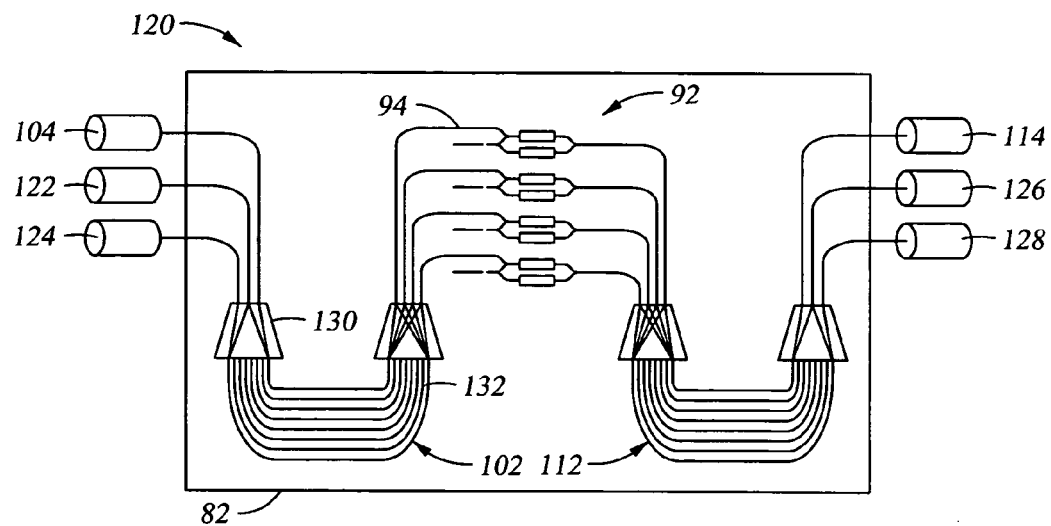
FIG. 11 is a plan view of an optical circuit embodying the add/drop multiplexer and regenerator of FIG. 10.

An integrated version of the combined add/drop regenerator 120 illustrated in FIG. 11 implements the add/drop regenerator 100 of FIG. 10 and is modified from the optical regenerator 80 of FIG. 9. It additionally includes two add fibers 122, 124 input to the AWG demultiplexer 102 through semiconductor waveguides and two drop fibers 126, 128 output from the multiplexer 112 through other semiconductor waveguides. In the typical single-port demultiplexer or multiplexer, the waveguide for the input or output fiber 104, 114 is connected to the center of a first free-space region 130 and multiple grating arms 132 are connected to the other side. In the multi-port demultiplexer 88 or multiplexer 90, the added waveguides associated with the add/drop fibers 122, 124 or 126, 128 are connected in progressively more off-centered positions in the exterior free-space regions. The wavelength selection, particularly of the demultiplexer 88, is changed for the added add fibers 122, 124 from that for the waveguide of the input fiber 104. In one design, the wavelength selection onto the wavelength channels with the wavelength converters 92 is shifted by one position for each further offset position on the input.

Figure 12:
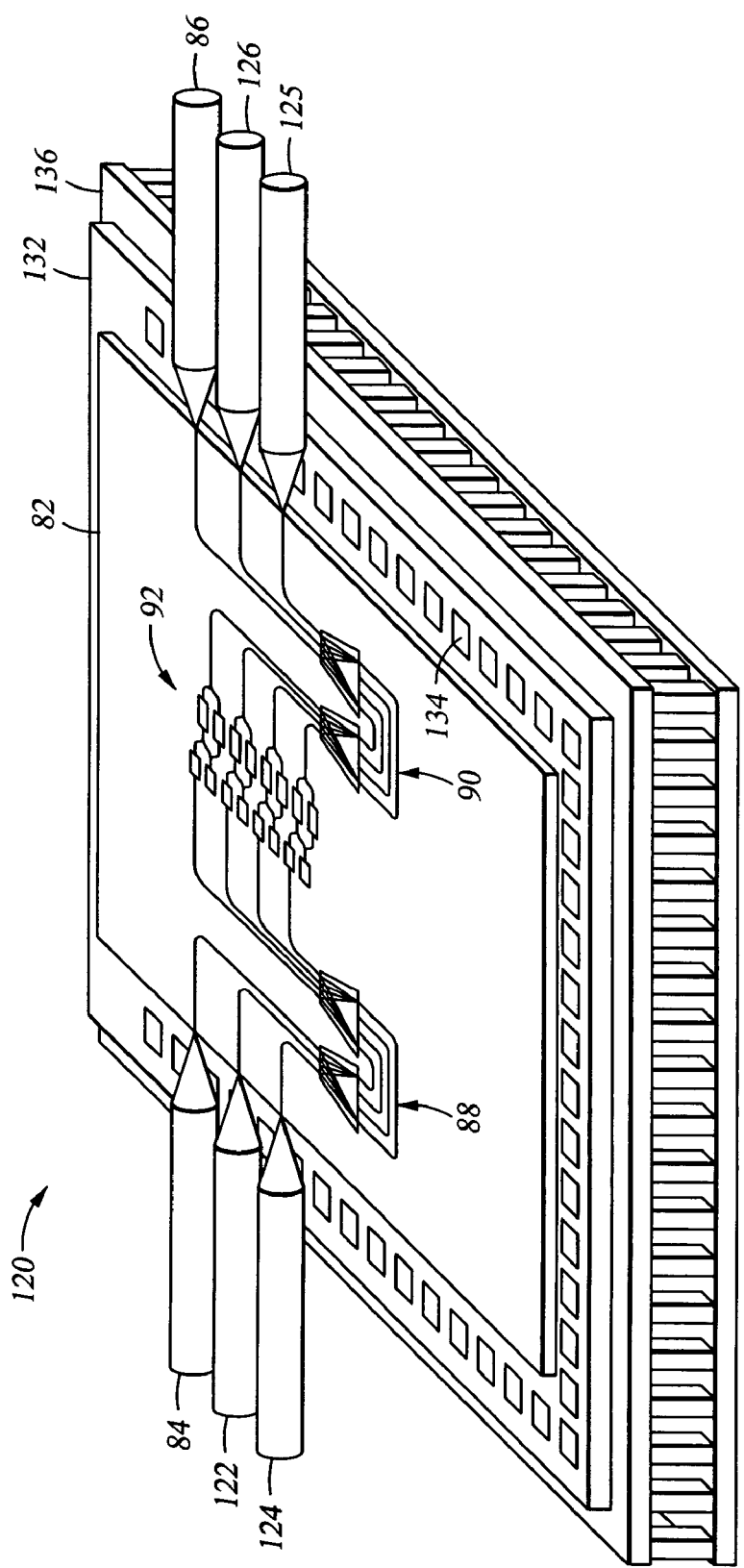
FIG. 12 is an orthographic view of an integrated system for the add/drop multiplexer and regenerator of FIGS. 10 and 11.

Further integration can be accomplished as illustrated in FIG. 12 for the ADM regenerator 120, in which the InP chip 82, having dimensions of 8 mm by 14 mm for sixteen 100 GHz WDM channels is mounted on a silicon micro-bench 132 including contact pads 134 for wires from outside and to the active areas and devices of the chip. In turn, the micro-bench 132 is mounted on a single thermo-electric cooler 136 providing simple temperature control of the entire circuit. The entire opto-electronic circuit 82 and mount 132 have dimensions of no more than about 2 cm on a side. The optical fibers 84, 86, 122, 124, 126, 128 are mounted on the silicon micro-bench 132 and have tapered ends end-coupled into semiconductor waveguides formed in the InP chip 82. Similar integration can be accomplished for other types of wavelength converters and regenerators, such as those previously described. Although it is not required, it is possible to integrate all the active elements and waveguides into the semiconductor chip 82. Alternatively, the chip 82 may be a silica or other passive substrate into which the passive waveguides and AWGs 88, 90 are integrated and the wavelength converters 92 and its active elements and possibly other active elements are formed in a small semiconductor chip optically coupled and preferably bonded to the silica chip. The integrated structure shown in FIG. 12 can be applied also to the various MZ interferometers and regenerators described in the remainder of the application.

Similar structures can be used for retiming a data pulse, particularly one which has been unduly broadened. In one embodiment of a retimer, any of the wavelength converters of FIGS. 2–5, the CW probe signal is replaced by a narrow pulse, whether it be a narrow pulsed signal or an ultra-short optical pulse, which is precisely synchronized to the desired new timing locked to the timing of the input signal. Yoo describes the generation of ultra-short (order of picoseconds) optical pulses of fixed repetition rate in the cited utility application on code division multiplexing. Only when the probe pulse and a degraded positive data signal coincide, is the effective gate of the wavelength converter opened up. Thereby, the modulated degraded data signal reemerges as a modulated retimed data signal.

Locking the new clock to the input signal is a separate issue. Conventional retiming circuits extracts the timing signal from the data signal itself and, in a process typically involving analog electronics and phase-locked loops, locks the frequency and phase of the new clock to the data signal in a process which may be called clock recovery. A more conventional method of clock recovery for optical networks has been described by Otani et al. in "40-Gb/s optical 3R regenerator using electro absorption modulators for optical networks," *Journal of Lightwave Technology*, vol. 20, no. 2, Feb. 2002, p. 195 et seq. This approach, which is derived from conventional communication networks, includes the photo detection of the input signal (optical to electrical conversion), an electrical band-pass filter, a phase locked loop, and a frequency doubler followed by electrical/optical conversion in a modulator to generate a second optical probe signal. The use of photo detection and the need for high-speed analog electronics are considered disadvantageous because of their weight and cost, particularly for multi-channel reclocking required in WDM.

Ogura et al. have demonstrated optical gating with 2 ps optical pulses in "Picosecond all-optical gate using a saturable absorber in mode-locked laser," *IEEE Photonics Technology Letters*, vol. 10, no. 4, Apr. 1998, pp. 603–605. Smith et. al. have demonstrated all-optical clock recovery in "All-optical clock recovery using a mode-locked laser," *Electronics Letters*, vol. 28, no. 19, 10 Sep. 1992, pp. 1814–1816.

Figure 13:
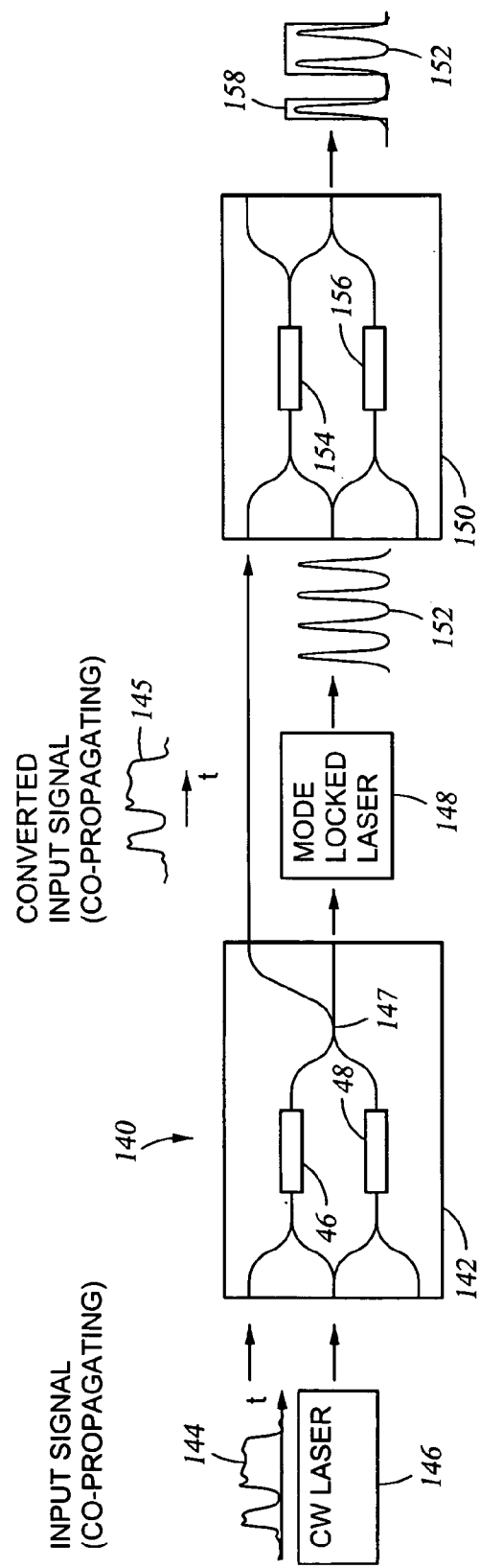
FIG. 13 is a schematic representation of an all-optical retiming circuit in conjunction with a wavelength converter.

In an all-optical 3R regenerator 140 schematically illustrated in FIG. 13, the modulated short-pulse data signal is produced by converting the typical non-return-to-zero (NRZ) optical data, having a relatively wide pulse width corresponding to the data rate, to a return-to-zero (RZ) format having an ultra-short optical (ps) pulse for each bit of data. This may be accomplished with a Mach-Zehnder interferometer 142 including the two active regions 46, 48, either amplifying or absorbing, in a structure described by Xu et al. in "All-optical data format conversion between RZ and NRZ based on a Mach-Zehnder interferometric wavelength converter," *IEEE Photonics Technology Letters*, vol. 15, no. 2, Feb. 2003, pp. 308–310. In the illustrated co-propagating configuration, an optical data signal 144 at the former wavelength is input into the MZ input that is connected to only the first active region 46. A CW laser 146 produces an unmodulated signal at the new wavelength, which is input into the MZ input connected to both the active regions 46, 48. The NRZ data input signal 144 and the CW laser source 146 are combined in the first active region 46 while only the CW laser source 146 is supplied to the second active region 48. The two signals are recombined and thereby interfere with each other to produce at its output a converted input signal 145 at the new wavelength but with the same data modulation as the input signal 144. A Y-coupler 147 splits the output signal 145 to inputs both of a mode-locked laser 148, such as that described by Ogura et al. above, and of a retiming section 150. The mode locked laser 148 is structured to provide a well defined pulse train 152 of narrow pulses of optical radiation at or near the frequency of the optical signal. The pulse train 152 is locked to the optical signal it receives and can be used as a clock recovered from the data signal 145. The mode locked laser 148 acts an all-optical clock recovery circuit receiving the optical data signal from the Y-coupler and producing an unmodulated sequence 152 of timing pulses. The phase and precise repetition rate is locked to the long term average of the data signal typically through a resonant structure. The data modulation of the input signal 145 is lost in the mode locked laser 148.

The retiming section 150 may be formed as another MZ interferometer with two semiconductor amplifying regions 154, 156 which receives the pulsed output 152 of the mode locked laser 148 on its common input and receives the wavelength converted data signal on another input. The active regions 154, 156 may alternatively be absorbers to provide ultra-fast response. The MZ interferometer acts as an AND circuit between its two inputs with a sufficiently long lifetime in its amplifying regions to provide a sufficiently long output pulse. The signal levels in the retiming section 150 are controlled according to the reshaping aspects of the invention described before to produce a reshaped and retimed optical data signal. Its output is a retimed data signal 158 locked to the optically recovered clock signal 152 The timing of the clocking will depend on the external modulation from the data signal. In the invention, the clocking may depend upon external modulation of gain or loss in the laser cavity if "active" or "hybrid" mode-locking is effective.

Although a co-propagating Mach-Zehnder interferometer has been described with the above aspect of the invention, other types of MZ interferometer may provide yet further advantages.

The mode locked laser (MLL) for this application may assume various forms. Its output will be optically phase locked to an input signal due to the input signal modulating gain for a gain modulated MLL, modulating absorption for a phase modulated MLL, or modulating phase for a phase modulated MLL. The MLL may consist of a simple distributed feed back (DFB) laser with electro absorption modulators or a more complex colliding pulse MLL, such as a linear structure disclosed by Chen et al. in "Monolithic colliding-pulse mode-locked quantum-well lasers," *IEEE Journal of Quantum Electronics*, vol. 28, no. 30, October 1992, pp. 2176–2185 or a ring structure disclosed by Hansen et al. in "A 1.54-µm monolithic semiconductor ring laser: CW and mode-locked operation, *IEEE Photonics Technology Letters*, vol. 4, no. 5, May 1992, pp. 411–413. I have disclosed short pulse clock sources in the previously cited application Ser. No. 10/645,165. Gain switched lasers can also be used for the clock source, as described by Owen et al. in "10-Gbits/s all-optical 3R regeneration and format conversion using a gain-switched DFB laser," *Technical Digest, Conference on Lasers and Electro-Optics* (CLEO 2000, Postconference Edition, TOPS vol. 39, (IEEE Cat. No.00CH37088), Optical Soc. America, 2000, pp. 472, 473. However, gain-switched lasers tend to produce excessive chirping.

Other configurations of Mach Zehnder interferometers may be substituted for those illustrated in FIG. 13. A particularly advantageous structure closely follows the wavelength converter 70 of FIG. 4 in which the 1520 nm laser 74 is a mode locked laser locked to the optical data signal at its original wavelength which has been amplified in the optical amplifier 36. As a result, the converted signal 56 output from the regenerator 70 has been regenerated, reshaped, retimed, and possibly converted to a new wavelength.

The invention thus provides for all-optical regeneration for multi-wavelength signals and may be integrated in a single substrate. The regeneration may be performed either in an independent regenerator circuit or with circuits mostly implemented as optical routers or add/drop multiplexers by selective biasing of the active elements.

The invention claimed is:

1. An optical regenerator, comprising a wavelength converter receiving an optical input signal at a first carrier wavelength modulated by a data signal and including an optical source producing a probe signal at a second carrier wavelength, and at least one semiconductor active region and being capable of converting the carrier wavelength of said optical input signal from said first wavelength to said second wavelength on an optical output signal according to a wave-shaped transfer function between said optical input and output signals, wherein an amplitude of said optical input signal and a biasing of said at least one active region are selected to place said optical input signal to substantially extends across only one peak-to-peak portion of said respective transfer function.

2. The regenerator of claim 1, comprising:
   an optical demultiplexer receiving a multi-wavelength signal;
   a plurality of said wavelength converters having respective inputs connected to different outputs of said demultiplexer; and
   a multiplexer receiving outputs of the wavelength converters and combining said optical output signals into a multi-wavelength signal.

3. The regenerator of claim 1, wherein said wavelength converter includes a interferometer receiving both said optical input signal and said probe signal.

4. The regenerator of claim 3, wherein said interferometer is a Mach-Zehnder interferometer.

5. The regenerator of claim 1, wherein said optical source comprises a tunable laser.

6. The regenerator of claim 1, wherein said optical source comprises a mode-locked laser locked to said optical input signal.

7. A multi-wavelength optical regenerator, comprising:
   a demultiplexer receiving a multi-wavelength optical signal impressed upon respective and different first optical wavelengths and routing them according to wavelengths to a plurality of wavelength-separated optical input signals;
   a plurality of wavelength converters each receiving a respective one of said optical signals, including a optical source having a second wavelength, and at least one semiconductor active region and being capable of converting the wavelength of said wavelength-separated optical input signal from said first wavelength to said second wavelength on a respective wavelength-separated output signal according to a respective wave-shaped transfer function between respective ones of said wavelength-separated optical input and output signals, wherein an amplitude of said respective wavelength-separated optical input signal and a biasing of said at least one active region is selected to place said respective wavelength-separated optical input signal substantially extends across only one peak-to-peak portion of said respective transfer function; and a multiplexer receiving outputs of the wavelength converters and combining said optical output signals into a multi-wavelength signal.

8. The regenerator of claim 7, wherein said optical source is unmodulated and said wavelength converter includes an active semiconductor region for converting said wavelength of said wavelength-separated optical input signal.

9. The regenerator of claim 7, wherein said optical source comprises a tunable laser.

10. The regenerator of claim 9, wherein said demultiplexer additionally receives additional optical signals and said multiplexer outputs to a plurality of outj,uts, whereby said tunable lasers can selectively switch signals from any of said optical signals to any of said plurality of outputs.

11. The regenerator of claim 9, wherein said demultiplexer receives signals from a plurality of input ports and said multiplexer outputs to a plurality of output ports.

12. The regenerator of claim 7, wherein said regenerator acts as both a regenerator and an addldrop multiplexer.

13. The regenerator of claim 7, wherein said regenerator acts as an optical router including a wavelength router.

14. The regenerator of claim 7, wherein said wavelength-separated optical signals remain unswitched between said demultiplexer and said multiplexer.

15. The regenerator of claim 7, wherein said transfer function is sinusoidal.

16. The regenerator of claim 7, wherein said multiplexer and demultiplexer and at least portions of said wavelength converters are formed in a monolithic chip.

17. The regenerator of claims 16, wherein said multiplexer and demultiplexer comprise arrayed waveguide gratings.

18. The regenerator of claim 7, wherein said wavelength converters comprise Mach-Zehnder interferometers.

19. The regenerator of claim 7, wherein respective optical channels carrying respective ones of said wavelength-separated optical input and output signals are connected between said demultiplexer and multiplexer and are not switchable in between.

20. A regenerating wavelength converter, comprising:
   a mode locked laser;
   a source laser outputting an unmodulated signal at a laser wavelength;
   a first Mach-Zehnder interferometer receiving on a first input a data modulated optical signal and on a second input the output of the source laser and having an output received by the mode locked laser; and
   a second Mach-Zehnder interferometer receiving outputs of said mode locked laser and said first Mach-Zehnder interferometer to produce an output signal that is data modulated similarly to said optical input signal at the laser wavelength determined by said source laser.

21. The converter of claim 20, further comprising a semiconductor optical amplifier receiving said data modulated optical input signal.

22. The converter of claim 20, wherein said data modulated optical input signal has a carrier wavelength of between 1535 and 1565 nm and said mode-locked laser produces pulses of radiation at a wavelength of less than 1535 nm.

23. An optical regeneration method, comprising the steps of:
   receiving an optical input signal having a data signal modulating a carrier at a first wavelength;
   generating an optical probe signal at a second wavelength; and
   interfering said optical input signal and said probe signal including passing them through a semiconductor active region to produce an optical output signal having said data signal modulating a carrier at said second wavelength, whereby said interfering produces a wave-shaped transfer function between amplitudes of said optical input signal and said optical output signal; and
   biasing said semiconductor active region so that an amplitude of said optical input signal extends substantially across only one peak-to-peak portion of said transfer function.

24. The method of claim 23, further comprising:
   generating a clock signal locked to said optical input signal; and
   gating said optical output signal according to said clock signal.

25. The converter of claim 20, wherein said source laser is a tunable laser.

* * * * *

UNITED STATES PATENT AND TRADEMARK OFFICE
CERTIFICATE OF CORRECTION

| | | |
|---|---|---|
| PATENT NO. | : 7,099,586 B2 | Page 1 of 1 |
| APPLICATION NO. | : 10/934673 | |
| DATED | : August 29, 2006 | |
| INVENTOR(S) | : Sung-Joo Ben Yoo | |

It is certified that error appears in the above-identified patent and that said Letters Patent is hereby corrected as shown below:

In claim 10 (at column 13, line 12), please delete the word, "outj,uts" and replace with the word --outputs--.

In claim 12 (at column 13, line 19), please delete the term, "addldrop" and replace with the term --add/drop--.

Signed and Sealed this

Twenty-eighth Day of November, 2006

JON W. DUDAS
*Director of the United States Patent and Trademark Office*